United States Patent [19]

Hehl

[11] Patent Number: 4,564,348
[45] Date of Patent: Jan. 14, 1986

[54] MACHINE BASE FOR INJECTION MOLDING MACHINE

[76] Inventor: Karl Hehl, Arthur-Hehl-Strasse 32, 7298 Lossburg 1, Fed. Rep. of Germany

[21] Appl. No.: 443,645

[22] Filed: Nov. 22, 1982

[30] Foreign Application Priority Data

Nov. 20, 1981 [DE] Fed. Rep. of Germany ....... 3145972

[51] Int. Cl.$^4$ .............................................. B29C 45/84
[52] U.S. Cl. ..................... 425/151; 198/536; 198/950; 198/861.1; 425/556; 425/542
[58] Field of Search ............... 198/616, 557, 535, 536, 198/862, 950; 425/403.1, 377, 556, 542, 192, 145, 151

[56] References Cited

U.S. PATENT DOCUMENTS

| | | | |
|---|---|---|---|
| 2,589,228 | 3/1952 | Cordis | 198/862 |
| 3,761,214 | 9/1973 | Hehl | 425/192 |
| 3,909,173 | 9/1975 | Latter | 425/192 |
| 3,988,099 | 10/1976 | Hehl | 425/145 |

FOREIGN PATENT DOCUMENTS 1255580 11/1967 Fed. Rep. of Germany ...... 198/616
443645 8/1962 United Kingdom .

Primary Examiner—Joseph E. Valenza
Attorney, Agent, or Firm—Joseph A. Geiger

[57] ABSTRACT

A machine base for an injection molding machine welded together of die-cut and die-formed sections of steel sheet, including a U-shaped base member, front and rear end walls, and an intermediate partition wall. The folded-over upper edges of the base member side walls carry two guide rails supporting and centering the die closing unit, and the front end wall has a parts discharge opening accommodating a longitudinally oriented parts discharge conveyor in a height-adjustable mounting arrangement. This makes it possible to have closed side walls on the machine base which prevent operators from reaching into the work space of the machine.

8 Claims, 9 Drawing Figures

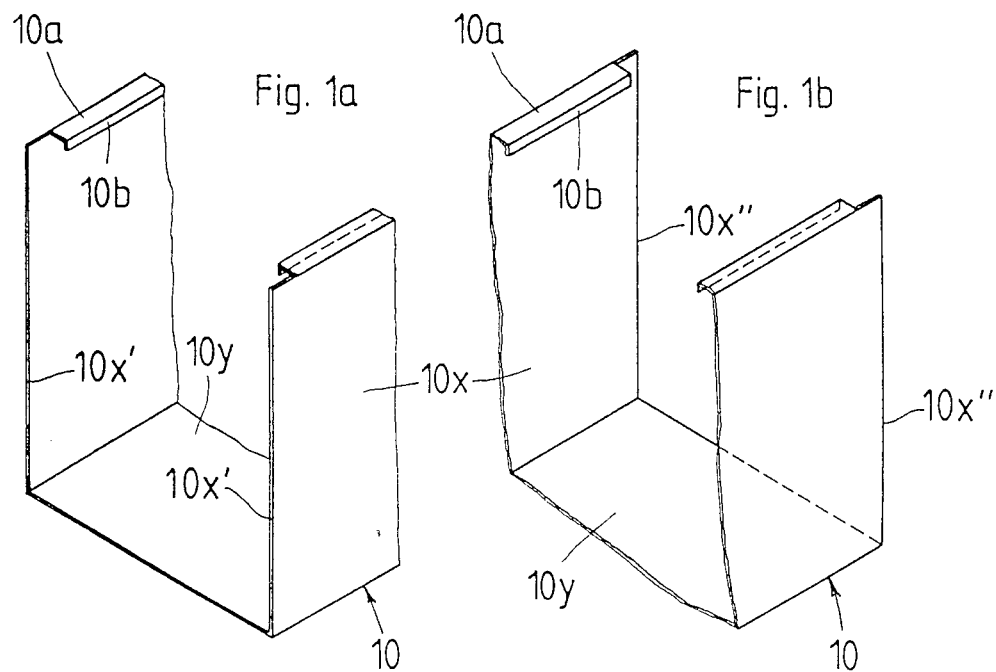
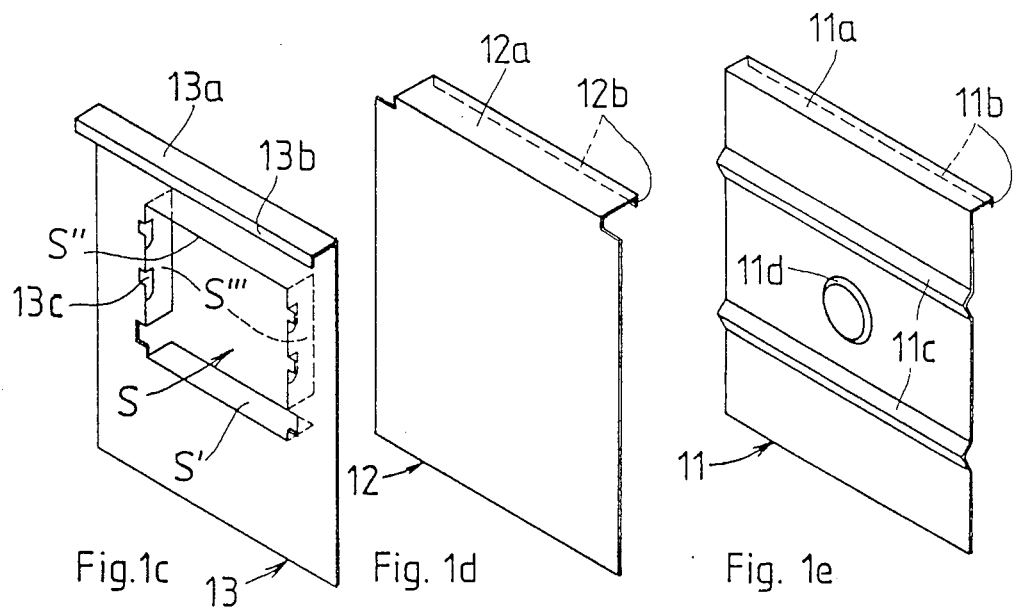

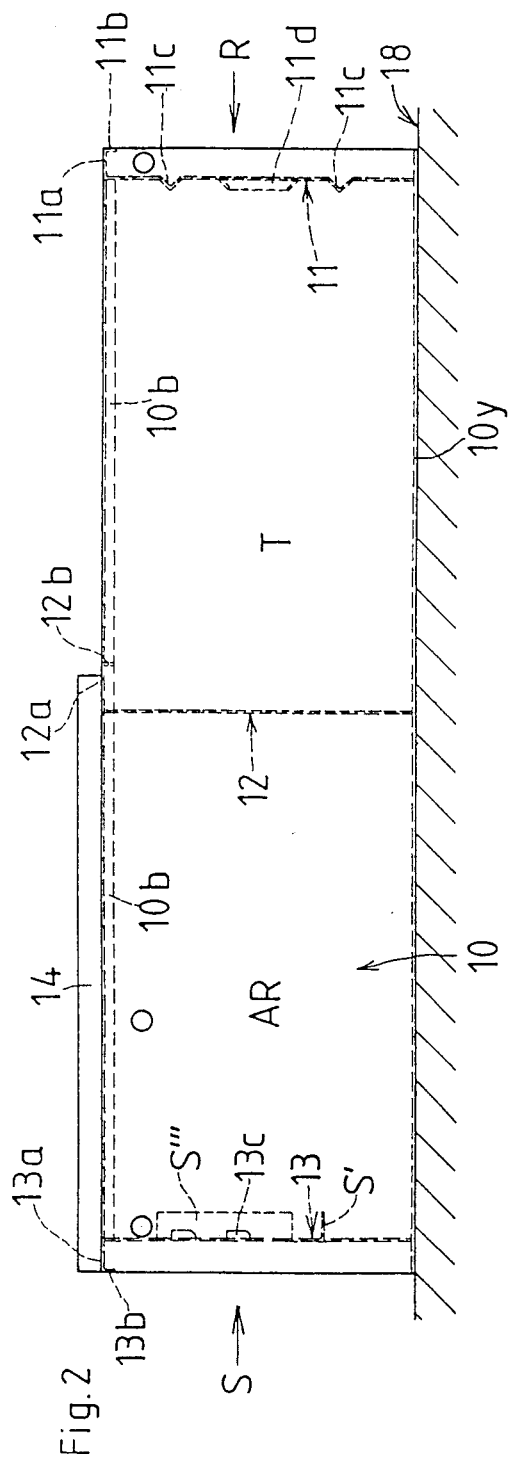
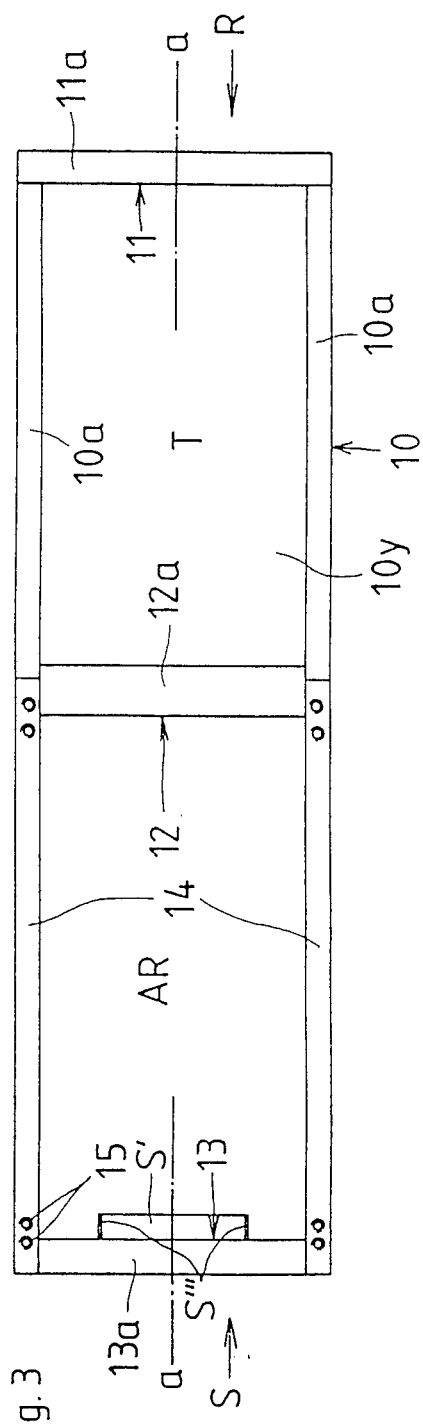

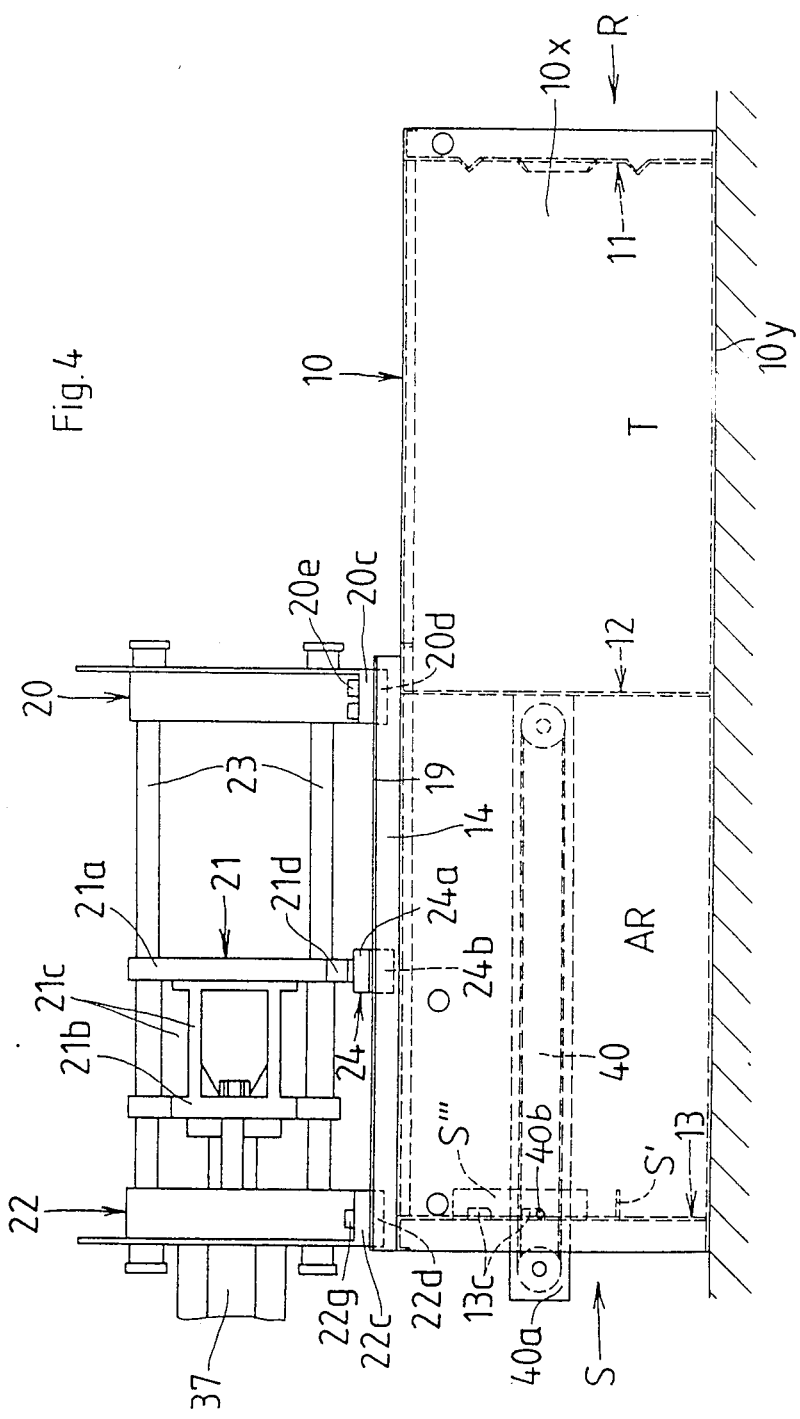

MACHINE BASE FOR INJECTION MOLDING MACHINE

BACKGROUND OF THE INVENTION

1. Field of the Invention

The present invention relates to injection molding machines and, more particularly, to a machine base for an injection molding machine which is welded together of die-cut and die-formed sections of steel sheet and which accommodates a longitudinal discharge conveyor underneath the die closing unit.

2. Description of the Prior Art

It is known to construct the machine base for an injection molding machine by welding together sections of heavy-gauge steel sheet. The resulting machine base is generally in the shape of an elongated block, forming a large reservoir chamber for hydraulic fluid between a rear end wall and an intermediate transverse partition wall, while carrying the die closing unit above an open chamber in the forward portion of the machine base. Examples of this type of machine base are described in German Pat. No. 21 12 310 and in German Offenlegungsschrift No. 23 37 276 and in the corresponding U.S Pat. No. 3,761,214 and No. 3,988,099.

Heretofore, it has been a common, well-established feature of this type of machine base to have the parts discharge conveyor arranged in the machine base in such a way that the conveyor extends transversely through one of the two longitudinal side walls of the base member, the parts discharge extremity of the conveyor being as a rule located on the same side on which the machine operator is normally positioned.

It has been found that this decades-old arrangement of the parts discharge opening in a machine base side wall can lead some machine operators, especially those of limited training, to react to machine malfunction by reaching into the work space of the machine base through the parts discharge opening, in an attempt to circumvent the closed safety cover of the die closing unit which covers only the longitudinal sides and the top of the latter.

SUMMARY OF THE INVENTION

Underlying the present invention is the primary objective of constructing an improved machine base of the type described above which precludes any accidents resulting from a machine operator reaching into the work space of the machine base through the parts discharge opening and which, at the same time, has a higher stability and torsion resistance under the weight of the die closing unit and one or more injection units.

The present invention proposes to attain this objective by suggesting a welded machine base for an injection molding machine which comprises a U-shaped base member with a bottom wall and two longitudinal side walls to which are welded front and rear end walls and an intermediate partition wall, and where the parts discharge opening is arranged in the front end wall, for a parts discharge conveyor which is arranged longitudinally underneath the die closing unit.

In a preferred embodiment of the invention, the parts discharge opening includes means for adjustably setting the height of the parts discharge conveyor belt, so as to minimize that portion of the parts discharge opening which remains accessible above the conveyor belt.

The removal of the parts discharge opening from the side wall on the operator's side of the injection molding machine not only renders access to the work room from this side virtually impossible, it also eliminates a previously present source of weakness in this side wall in the form of the large parts discharge opening. The arrangement of the parts discharge opening in the front end wall greatly reduces the temptation for the operator to reach into the work room, in the case of machine malfunction, because the opening is located underneath the overhanging portion of the die closing unit and also, because the area of the machine in which malfunction takes place most frequently is located at a much greater distance from the proposed parts discharge opening, as compared to the known opening in the side wall.

Finally, the vertical adjustability of the parts discharge conveyor in relation to the parts discharge opening makes it possible to effectively defeat any attempt at reaching into the critical zones of the die closing unit, if the position of the conveyor belt is adjusted for a gap to the upper ledge of the parts discharge opening which is just large enough for a safe passage of the injection-molded parts through the opening.

The preferred embodiment of the invention suggests an additional improvement in the resistance of the machine base structure and in terms of material savings in the form of a U-shaped base member which is cold-formed in a succession of 90°-folds, to form the bottom wall and two closed longitudinal side walls of the machine base on opposite sides of the parts discharge conveyor. Such a machine base is capable of carrying comparatively heavy die closing units and injection units with a greater margin of safety against accidents.

This improved machine base structure offers a further advantage in connection with the standardized production of injection molding machines in that it eliminates previously required welding operations at the junction between the bottom wall and the side walls. Lastly, it simplifies the requirements in connection with the mechanical removal of the injection-molded parts by allowing for a longitudinally centered arrangement of the parts discharge conveyor in the machine base in a simplified mounting configuration. The latter may include height adjustability for the conveyor on both extremities of the latter. This parts discharge conveyor represents an improvement over the prior art conveyor which has to protrude a much greater distance over the parts discharge opening and which lacks height adjustability.

BRIEF DESCRIPTION OF THE DRAWINGS

Further special features and advantages of the invention will become apparent from the description following below, when taken together with the accompanying drawings which illustrate, by way of example, a preferred embodiment of the invention which is represented in the various figures as follows:

FIGS. 1a and 1b show the longitudinal end portions of the base member of the machine base of FIG. 1;

FIGS. 1c, 1d and 1e show three sheet metal sections which are welded to the base member of the machine base;

FIG. 2 shows the machine base of FIG. 1 in an elevational view;

FIG. 3 shows the machine base of FIG. 1 in a plan view; and

FIG. 4 shows a die closing unit and a parts discharge conveyor mounted on the machine base of FIGS. 1-3.

DESCRIPTION OF THE PREFERRED EMBODIMENT

Figure 1:
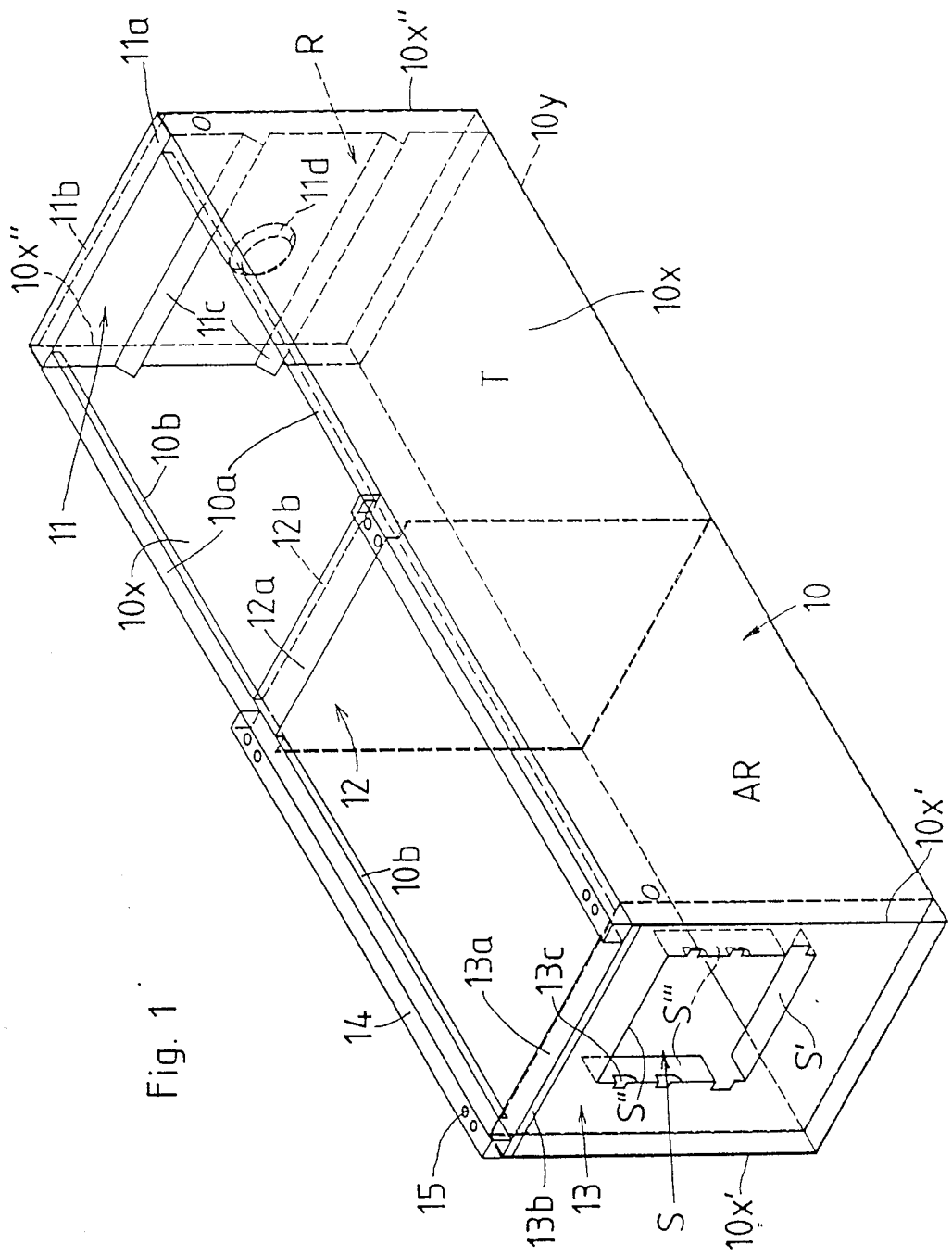
FIG. 1 shows, in a perspective view, a machine base for an injection molding machine embodying the present invention.

Referring to the drawings, FIGS. 1, 2 and 3 show an elongated, block-shaped machine base for an injection molding machine, and FIGS. 1a-1e show component sections of the machine base of FIG. 1. Accordingly, the machine base is composed of four die-cut and die-formed sections of steel sheet: a U-shaped base member 10 forming the bottom wall 10x and two longitudinal side walls 10y, a rear end wall 11, an intermediate partition wall 12, and a front end wall 13.

The three walls 11, 12 and 13, matching the interior cross-sectional shape of the base member 10, are welded to the latter along their bottom and side edges to form containing walls and/or cross-bracing members. The partition wall 12, located at approximately mid-length of the machine base, subdivides the interior space of the machine base into two chambers, a closed reservoir chamber T in the rear half of the machine base and a forward chamber AR in the forward half of the machine base. The reservoir chamber T contains the hydraulic fluid for the various drives and controls of the injection molding machine.

The rear end wall 11 is formed with two vertically spaced transverse stiffening pleats 11c and a central supporting collar 11d for a hydraulic pump and motor unit, of which the pump is located inside the reservoir chamber T. The front end wall 13 has a central rectangular aperture in the form of a parts discharge opening S with rearwardly extending support ledges S' and S''' at the horizontal bottom edge and vertical side edges, respectively, of the opening S. The purpose of these ledges will be discussed further below, in connection with the arrangement of a parts discharge conveyor in the forward chamber AR.

As can be seen in FIGS. 1a through 1e, all the vertical walls of the machine base have on their upper edges a reinforcing edge formation which consists of a horizontal intermediate flange portion 10a, 11a, 12a or 13a, obtained in a 90°-folding operation, and a vertically downwardly extending edge flange portion 10b, 11b, 12b or 13b, respectively, obtained in another 90°-folding operation. In the case of the longitudinal side walls 10x of the base member 10, these edge formations protrude inwardly from the side walls; in the case of the front end wall 13 and rear end wall 11, the edge formations protrude longitudinally outwardly.

The front end wall 13 is therefore recessed rearwardly from the front edge 10x' of the base member side wall 10x by a distance which corresponds to the horizontal width of its intermediate flange portion 13a. Similarly, the rear end wall 11 is recessed forwardly from the rear edges 10x'' of the base member side walls 10x by a distance which corresponds to the width of its intermediate flange portion 11b. The partition wall 12 has a somewhat wider intermediate flange portion 12a which extends rearwardly from the partition wall 12. The horizontal intermediate flange portions 10a, 11a, 12a and 13a of the four component parts of the machine base are horizontally aligned and welded at their junctions, so as to create a planar horizontal mounting surface. FIGS. 1a and 1b show that the edge formations 10a and 10b of the base member 10 stop short of the extremities of the side walls 10x, in order to accommodate the edge formations of the front and rear end walls 13 and 11, respectively. The edge formation 12a, 12b of the partition wall 12 is recessed from the vertical edges of the partition wall 12, in order to fit between the edge formation 10a, 10b of the base member side walls 10x.

In order to permit the mounting and centering of a die closing unit in the machine base (FIG. 4), the latter has arranged on top of its side wall edge formations 10a, 10b two parallel guide rails 14 which extend from the forward extremity to the mid-portion of the machine base. The guide rails 14 are of square cross section, their width corresponding approximately to the width of the intermediate flange portions 10a of the side walls 10x. The guide rails 14 are permanently attached to the machine base by longitudinal welds, and they are machined for precise parallel alignment.

FIG. 4 shows a push-type die closing unit mounted on the two guide rails 14 of the machine base. The horizontal upper guide faces and the inwardly oriented vertical guide faces of the guide rails 14 may be covered with hardened runway strips 19. These guide faces perform a positioning and centering function for the stationary die carrier plate 20 and for the stationary cylinder head plate 22, while performing an exterior guide function for the movable die carrier frame 21.

For this purpose, the stationary die carrier plate 20 has horizontal heel portions 20c and vertical heel portions 20d, the latter being spaced for a precise positive centering engagement between the vertical guide faces of the guide rails 14. The stationary cylinder head plate 22, which carries a hydraulic actuator assembly 37, has similar horizontal heel portions 22c and vertical heel portions 22d in precise alignment with the heel portions 20c and 20d of the stationary die carrier plate 20. Attachment bolts 20d and 22g clamp the stationary plates 20 and 22 to the guide rails 14 by engaging threaded bores 15 (FIG. 3) of the latter.

The positively centered and clamped attachment of the stationary die carrier plate 20 and of the stationary cylinder head plate 22 of the die closing unit against the guide rails 14 of the machine base has the additional advantage of stabilizing the longitudinal side walls 10x of the latter in a torsion-free, parallel-aligned relationship.

Four parallel horizontal tie rods 23 have their longitudinal extremities rigidly attached to the stationary plates 20 and 22, thereby forming a rigid stationary frame structure. The movable die carrier frame 21, consisting essentially of a pressure transfer wall 21d, a die mounting wall 21a and longitudinal pressure transfer ribs 21c in the four corners of the frame, has appropriate guide bushings for the tie rods 23.

The weight of the movable die carrier frame 21 is not supported by the four tie rods 23, but by two exterior guide members 24, on struts 21d of the die mounting wall 21a. The guide members 24 have horizontal legs 24a and vertical legs 24b with which they engage the vertical and horizontal guide faces of the guide rails 14, the guide members 24 being adjustable vertically and horizontally in relation to the struts 21d.

Underneath the die closing unit, inside the forward chamber AR of the machine base, is arranged a parts discharge conveyor 40 which extends axially and preferably in the longitudinal center plane a—a of the machine base and die closing unit. The discharge extremity 40a of the conveyor 40 extends only a short distance forwardly from the parts discharge opening S of the front end wall 13, being thus located directly underneath the hydraulic actuator assembly 37 of the die closing unit.

The parts discharge conveyor 40 is supported near its discharge extremity 40a by means of anchoring pins 40b which engage one of a plurality of vertically space positioning notches 40c in the front end wall 13. This makes it possible to adjust the height of the parts discharge conveyor within the opening S, in accordance with the space which is required for the passage of the injection-molded parts through this opening.

By always adjusting the position of the parts discharge conveyor 40 for the smallest-possible opening above the conveyor belt, it is possible to effectively defeat any attempt by an operator to reach into the work space of the machine underneath the die closing unit, in the case of machine malfunction.

The lower ledge S' on the parts discharge opening S serves as a support for the conveyor 40 in its lowest position; the side ledges S''' provide lateral support, in addition to holding the anchoring pins 40b in their notches 13c. The rear extremity of the parts discharge conveyor 40 is supported on the partition wall 12, and this support is preferably likewise adjustable in height.

It should be understood, of course, that the foregoing disclosure describes only a preferred embodiment of the invention and that it is intended to cover all changes and modifications of this example of the invention which fall within the scope of the appended claims.

I claim the following:

1. In an injection molding machine having a machine base, a parts discharge conveyor arranged in said machine base and a horizontally oriented die closing unit of which a stationary die carrier member with a stationary die half of an injection molding die is mounted on top of the machine base, near the center of the latter, and a movable die carrier member with a movable die half of said injection molding die is guided for horizontal opening and closing movements along the longitudinal center axis of the die closing unit by means of longitudinal guide members, and where the piston rod of a longitudinally oriented hydraulic cylinder assembly is connected to said movable die carrier member to produce its opening and closing movements, the weight of the die closing unit is supported on a forward portion of the machine base, while a rearward portion thereof is adapted to support an associated injection unit, and the injection-molded parts are discharged from the open die halves onto said parts discharge conveyor, the improvement in the machine base comprising:

a substantially rectangular horizontal bottom wall;
two continuous, substantially rectangular vertical longitudinal side walls adjoining the bottom wall on opposite longitudinal edges thereof;
a substantially rectangular vertical front end wall transversely connecting the bottom wall and the two side walls near one longitudinal extremity thereof;
a substantially rectangular vertical rear end wall transversely connecting the bottom wall and the two side walls near the other longitudinal extremity thereof; and
a substantially rectangular vertical partition wall transversely connecting the bottom wall and the two side walls at a place which is located underneath the stationary die carrier member; and wherein
said constituent walls are of steel sheet and welded together to form a block-shaped, elongated container-like structure of high resistance against torsional deformation, the machine base defining an upwardly open reservoir chamber between the rear end wall and the partition wall and a likewise upwardly open forward chamber between the front end wall and the partition wall, said forward chamber being inaccessible from the longitudinal sides of the machine base, at least in the area underneath the injection molding die of the die closing unit;
the front end wall has a parts discharge opening for the arrangement of said parts discharge conveyor in the forward chamber of the machine base in such a way that the discharge extremity of said conveyor protrudes forwardly from said opening in the front end wall while being supported by the latter;
the front end wall is located at such a longitudinal distance from the injection molding die that manual access to the injection molding die through the parts discharge opening is impossible; and
the front end wall includes means for adjusting the height of said parts discharge conveyor which extends through its parts discharge opening.

2. A machine base as defined in claim 1, wherein
the parts discharge opening of the front end wall is of substantially rectangular outline, having on at least its two vertical edges parallel inwardly extending side ledges; and
said height adjustment means includes a plurality of vertically spaced conveyor positioning notches in the side ledges and matching anchoring pins for a parts discharge conveyor.

3. A machine base as defined in claim 1, wherein
the partition wall similarly includes means for supporting and for adjusting the height of the parts-receiving extremity of said longitudinally oriented parts discharge conveyor.

4. A machine base as defined in claim 1, wherein
the bottom wall and the longitudinal side walls are integral portions of a U-shaped base member, the longitudinal junctions between said walls being 90°-folds.

5. A machine base as defined in claim 1, wherein
the horizontal upper longitudinal edges of the side walls have reinforcing edge formations defined by 90°-inwardly-folded horizontal intermediate flange portions and adjoining 90°-downwardly-folded vertical edge flange portions.

6. A machine base as defined in claim 5, wherein
the horizontal upper transverse edges of the front end wall, of the rear end wall, and of the intermediate partition wall have similar reinforcing edge formations defined by horizontal intermediate flange portions and vertical edge flange portions, respectively; and
said upper edges of the constituent walls of the machine base have their horizontal intermediate flange portions aligned to define a common horizontal mounting plane on the machine base.

7. A machine base as defined in claim 6, wherein
the horizontal intermediate flange portions of the front and rear end walls extend longitudinally outwardly from said walls; and
the front and rear end walls are set back longitudinally inwardly from the vertical edges of the side wall extremities by a distance corresponding to the horizontal width of their intermediate flange portions.

8. A machine base as defined in claim 5, further comprising
two horizontal parallel guide rails arranged on top of said edge formations and attached thereto by welds, the guide rails having aligned horizontal guide faces and parallel inwardly facing vertical guide faces, for the support and centered positioning of a die closing unit on said rails.

* * * * *